(12) United States Patent
Yoshinaga et al.

(10) Patent No.: US 7,690,489 B2
(45) Date of Patent: Apr. 6, 2010

(54) CLUTCH INCLUDING DAMPER SPRINGS

(75) Inventors: Kei Yoshinaga, Saitama (JP); Masaki Yoneyama, Saitama (JP); Isamu Takahashi, Saitama (JP); Yoshiki Nagahashi, Saitama (JP); Ken Yamanaka, Saitama (JP); Kazumitsu Yamamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 322 days.

(21) Appl. No.: 11/584,523

(22) Filed: Oct. 23, 2006

(65) Prior Publication Data

US 2007/0089964 A1 Apr. 26, 2007

(30) Foreign Application Priority Data

Oct. 25, 2005 (JP) ............................. 2005-309395

(51) Int. Cl.
*F16H 55/14* (2006.01)
*F16D 13/58* (2006.01)

(52) U.S. Cl. .............. 192/55.61; 192/70.17; 192/113.5; 192/212

(58) Field of Classification Search .............. 192/55.61, 192/212, 214.1, 113.5
See application file for complete search history.

(56) References Cited

U.S. PATENT DOCUMENTS

| | | | |
|---|---|---|---|
| 5,505,288 A * | 4/1996 | Tomiyama et al. ..... | 192/213.31 |
| 5,659,876 A * | 8/1997 | Mizuta ........................... | 419/8 |
| 6,360,861 B1 | 3/2002 | Sumi et al. | |
| 6,626,278 B2 * | 9/2003 | Sugita et al. .............. | 192/70.27 |
| 2002/0153221 A1* | 10/2002 | Schnepf .................... | 192/70.17 |
| 2002/0179188 A1* | 12/2002 | Yamaguchi et al. ......... | 148/218 |
| 2003/0038012 A1* | 2/2003 | Kumagai et al. ........... | 192/70.2 |
| 2003/0085094 A1* | 5/2003 | Miyoshi et al. .......... | 192/70.12 |
| 2005/0150736 A1* | 7/2005 | Kataoka et al. ............ | 192/54.5 |
| 2005/0183921 A1* | 8/2005 | Sugita et al. ............. | 192/70.27 |

FOREIGN PATENT DOCUMENTS

| JP | 61-59023 A | 3/1986 |
|---|---|---|
| JP | 5-248512 A | 9/1993 |

\* cited by examiner

*Primary Examiner*—Rodney H Bonck
(74) *Attorney, Agent, or Firm*—Birch, Stewart, Kolasch & Birch, LLP

(57) ABSTRACT

A clutch for effectively prevents a clutch outer from tilting at the time when torque is varied. The clutch includes damper springs for transmitting, to a clutch outer, torque inputted to a driven gear, and a thrust washer for regulating positional change of a position of the clutch outer with respect to the driven gear in a direction of the shaft axis. The thrust washer is disposed between the driven gear and the clutch outer in an axial direction. The thrust washer is disposed only outward of the damper springs in a radial direction.

17 Claims, 1 Drawing Sheet

CLUTCH INCLUDING DAMPER SPRINGS

CROSS-REFERENCE TO RELATED APPLICATION

The present application claims priority under 35 U.S.C. §119 to Japanese Patent Application No. 2005-309395, filed Oct. 25, 2006, the entire contents of which are hereby incorporated by reference.

BACKGROUND OF THE INVENTION

1. Field of the Invention

The present invention relates to a clutch including damper springs which transmit, to a clutch outer, torque inputted to an input rotator. The clutch is provided in a power transmission device to which power of an internal combustion engine is transmitted, the power transmission device, for example, being mounted on a vehicle.

2. Description of Background Art

As a clutch including damper springs, for example, there is one disclosed in Japanese Patent Laid-Open No. Hei 5 (1993)-248512. In this clutch, a thrust washer is interposed between a clutch outer and a primary driven gear meshing with a primary drive gear fixedly mounted on a crankshaft of an internal combustion engine. Moreover, the thrust washer is disposed inward of a damper formed of a coil spring in a radial direction.

In the above-described conventional technology, a point of application of torque applied from the primary driven gear to damper springs (dampers) and a point of application of torque applied from the primary driven gear through the damper springs to the clutch outer are offset to each other in the direction of the shaft axis. Accordingly, when the torques are radically varied, a phenomenon (hereinafter, referred to as "tilting of clutch outer") occurs that a rotation centerline of the clutch outer is deflected with respect to a rotation centerline of the primary driven gear. Then, a degree of the tilting of the clutch outer becomes larger as an amount of the above-described offset becomes larger.

The tilting of the clutch outer, which is as described above, is suppressed to some extent by the thrust washer of the above-described conventional technology. However, in order to further suppress the tilting of the clutch outer, it is necessary to increase the rigidity of a supported portion (for example, a boss portion engaged with the primary driven gear) in the clutch outer. In this case, a weight increase of the clutch is brought about.

SUMMARY AND OBJECTS OF THE INVENTION

The present invention has been made in consideration for the circumstances described above. It is an object of the present invention to provide a clutch capable of suppressing the weight increase thereof and effectively suppressing the tilting of the clutch outer, which occurs when the torque is varied. Moreover, it is another object of the present invention to further achieve improving stabilization enhancement of damper characteristics brought by the damper springs. Further it is still another object of the present invention to achieve enhanced lubrication for the sliding portions among the input rotator, the clutch outer, and a regulating member by forming an oil inflow space with a large capacity inward of the damper springs in the radial direction without upsizing the clutch in the axial direction.

According to a first aspect of the invention, a clutch includes an input rotator, a clutch outer, damper springs which transmit, to the clutch outer, torque inputted to the input rotator, and a regulating member which is disposed between the input rotator and the clutch outer in the axial direction, and which regulates positional change of the clutch outer with respect to the input rotator in the direction of the shaft axis. In the clutch, the regulating member is disposed only outward of the damper springs in the radial direction.

As a result, regulating the position of the clutch outer in the direction of the shaft axis is performed close to an outer circumference of the clutch outer, which is apart from the rotation centerline. Accordingly, in comparison with the case where the regulating member is disposed inward of the damper springs in the radial direction, the positional change of the clutch outer in the direction of the shaft axis is effectively suppressed. In addition, between the input rotator and the clutch outer, the regulating member is only located outward of the damper springs in the axial direction, and accordingly contributes to suppression of the weight increase of the clutch or to weight reduction thereof.

According to a second aspect of the present invention, an oil groove is provided on at least one of contact surfaces of the input rotator and the regulating member, the contact surfaces contacting each other.

As a result, frictional force between the input rotator and the regulating member is reduced by oil in the oil groove, and when the input rotator and the clutch outer rotate relatively to each other, sliding between the input rotator and the regulating member becomes smooth.

According to a third aspect of the present invention, between the input rotator and the clutch outer in the axial direction, and inward of the damper springs in the radial direction, an oil inflow space is formed, to which oil lubricating sliding portions among the input rotator, the clutch outer, and the regulating member is supplied. The minimum width of the oil inflow space in the direction of the shaft axis is larger than a minimum thickness between portions of the regulating member in the direction of the shaft axis, the portions contacting the input rotator and the clutch outer.

As a result, between the input rotator and the clutch outer in the axial direction, the oil inflow space with a large capacity is formed owing to the fact that the minimum width of the oil inflow space in the direction of the shaft axis is larger than the maximum thickness of the regulating member in the direction of the shaft axis. Accordingly, the sliding portions among the input rotator, the clutch outer, and the regulating member are lubricated by an abundant amount of the oil. In addition, in the oil inflow space, members such as the regulating member are not provided, and accordingly, the oil inflow space with a large capacity is formed without upsizing the clutch in the direction of the shaft axis.

EFFECTS of the INVENTION

According to the first aspect of the present invention, suppression of the weight increase of the clutch or the weight reduction thereof is achieved while the tilting of the clutch outer is effectively suppressed.

According to the second aspect of the present invention, the sliding between the input rotator and the regulating member becomes smooth, and accordingly, stability of the damper characteristics brought about by the damper springs is enhanced.

According to the third aspect of the present invention, the sliding portions among the input rotator, the clutch outer, and the regulating member are lubricated by the abundant amount of oil in the oil inflow space without upsizing the clutch in the direction of the shaft axis, and accordingly, the lubricity of the sliding portions is enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figures 1A, 1B:
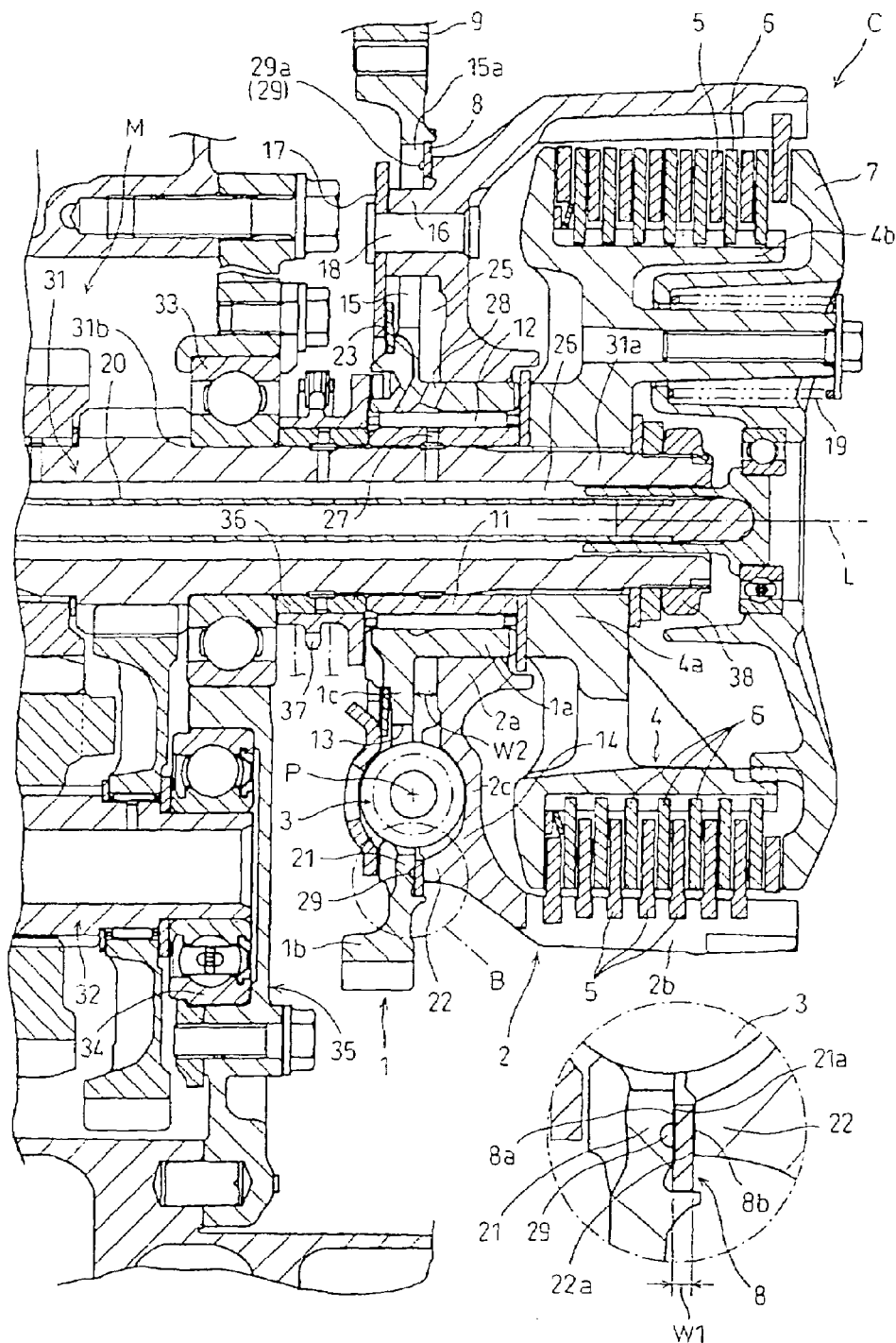
FIG. 1(A) is a cross-sectional view of main portions of a power unit including a clutch to which the present invention is applied.
FIG. 1(B) is an enlarged view of a range of B of FIG. 1(A).

Referring to FIG. 1(A), a multi-plate friction clutch C to which the present invention is applied constructs a power unit together with a multi-cylinder four-stroke internal combustion engine and a gear transmission M, and the power unit is mounted on a motorcycle as a vehicle. In the transmission M, a transmission ratio is established, which is set by a gear row selected through a shifting operation from among plural sets of gear rows composed of transmission gears provided on a main shaft 31 and a counter shaft 32. Then, torque generated in the internal combustion engine is transmitted to a rear wheel from a crankshaft which is an output shaft of the internal combustion engine as a power source through a power transmission device composed of the clutch C, the transmission M, and a final reduction device, and the torque thus drives the rear wheel.

The clutch C is provided on a shaft end portion 31a protruding from a transmission case 35 as a housing rotatably supporting the main shaft 31 and the counter shaft 32 through bearings 33 and 34 in the main shaft 31, and has a rotation centerline L which coincides with a rotation centerline of the main shaft 31. The clutch C includes a driven gear 1 as an input rotator to which torque from the crankshaft is inputted; a clutch outer 2 to which the torque from the driven gear 1 is transmitted; and damper springs 3 disposed between the driven gear 1 and the clutch outer 2 to transmit the torque of the driven gear 1 to the clutch outer 2 with having a damper function; a clutch inner 4 transmitting, to the main shaft 31, the torque from the clutch outer 2, which is transmitted through input-side clutch plates 5 and output-side clutch plates 6, which are mutually frictionally engageable. Also included are a pressure plate 7 contacting and separating the clutch plates 5 and the clutch plates 6 with each other; and a thrust washer 8 as a regulating member, which is disposed between the driven gear 1 and the clutch outer 2 in the axial direction, and which regulates the positional change of the clutch outer 2 with respect to the driven gear 1 in the direction of the shaft axis.

Note that, in the specification and the scope of claims, the axial direction, a radial direction, and a circumferential direction mean a direction parallel to the rotation centerline L of the clutch C, a diametric direction and a circumferential direction about the rotation centerline L taken as a center, respectively.

The driven gear 1 meshing with a drive gear 9 coupled to the crankshaft as a drive shaft so as to be rotatable integrally therewith and constructing a primary reduction mechanism together with the drive gear 9 is supported on the main shaft 31. The main shaft 31 serves as a driven shaft so as to be rotatable coaxially therewith, through a collar 11, which is rotatably fitted to an outer circumference of the main shaft 31 and a needle bearing 12 as a bearing, which is disposed on an outer circumference of the collar 11. The driven gear 1 has a boss portion 1a fitted to an outer circumference of the needle bearing 12, a rim portion 1b on which teeth meshing with the drive gear 9 are formed, and a web portion 1c coupling the boss portion 1a and the rim portion 1b to each other.

The closed-end cylindrical clutch outer 2, which surrounds the clutch inner 4, and which is supported on the main shaft 31 through the driven gear 1 so as to be rotatable coaxially with the main shaft 31, has a boss portion 2a which is rotatably fitted to an outer circumference of the boss portion 1a coaxial with the main shaft 31. The closed-end cylindrical clutch outer 2 also has an outer circumference portion 2b to which the clutch plates 5 are fitted so as to be rotatable integrally therewith, and a bottom portion 2c which couples the boss portion 2a and the outer circumference portion 2b to each other.

The plurality of damper springs 3 formed of coil springs are respectively housed in individually compressed states in a plurality of holding holes 13 provided in the web portion 1c at an interval in the circumferential direction and in a plurality of holding recessed portions 14 formed on the bottom portion 2c at positions matching with the respective holding holes 13. The plurality of damper springs 3 are held in the circumferential direction. Moreover, through a plurality of through holes 15 provided in the web portion 1c at an interval while sandwiching the holding holes 13 thereamong in the circumferential direction, columnar protruding portions 16 provided on the bottom portion 2c at an interval in the circumferential direction penetrate. Onto tip ends of the respective protruding portions 16, holding members 17 formed of annular plate members arranged opposite to the clutch outer 2 while sandwiching the driven gear 1 with the clutch outer 2 are fixedly attached by rivets 18. The respective damper springs 3 are held by the clutch outer 2 and the holding members 17 in the direction in the shaft axis in a state where positional change thereof is restricted in the direction of the shaft axis.

Then, the respective damper springs 3 are circumferentially extensible between the driven gear 1 and the clutch outer 2, and when radical torque variations occur between the driven gear 1 and the clutch outer 2 the damper springs 3 are deformed in response to magnitudes of the torque variations, thereby allowing a slight relative rotation between the driven gear 1 and the clutch outer 2, and thus attenuating a torque shock.

Moreover, a center P of each of the damper springs 3 in the axial direction is located close to the clutch outer 2 in the holding hole 13 or between the holding hole 13 and the holding recessed portion 14, and positions of application points in the driven gear 1 and the clutch outer 2, to which spring force of each of the damper springs 3 is applied, are offset from the center P of the damper spring 3 in the axial direction.

As described above, the center P is offset close to the clutch outer 2 with respect to the driven gear 1 in the direction of the shaft axis, thus making it possible to reduce a protruding amount of the damper spring 3 to an opposite side of the clutch outer 2 (transmission case 35 side) in the direction of the shaft axis. Accordingly, the driven gear 1, and eventually, the clutch C can be disposed close to the transmission case 35, and thus the clutch C can be disposed compactly in the direction of the shaft axis.

The clutch inner 4 disposed on the shaft end portion 31*a* more closely to a tip end thereof than both of the boss portions 1*a* and 2*a* has a boss portion 4*a* spline-fitted to the main shaft 31, and an outer circumferential portion 4*b* to which the plurality of clutch plates 6 stacked alternately with the clutch plates 5 are fitted so as to be rotatable integrally therewith.

The driven gear 1 and a drive sprocket 37, which is rotatably supported on the shaft end portion 31*a* through a collar 36, and which constructs a transmission mechanism driving an oil pump are arranged between the clutch inner 4 and the bearing 33 abutting on a step difference portion 31*b* of the main shaft 31, and positional change thereof is regulated by a nut 38 screwed to the tip end portion of the shaft end portion 31*a* in the direction of the shaft axis.

The pressure plate 7 is operated by a release mechanism including a push rod 20 which rotatably supports the pressure plate 7 rotating together with the clutch inner 4. The pressure plate 7 presses the clutch plates 5 and 6 by spring force of a clutch spring 19 disposed between the pressure plate 7 and the clutch inner 4, and by friction between the clutch plates 5 and 6 in such a compressed state, the clutch C turns to a connected state where the torque is transmitted between the clutch outer 2 and the clutch inner 4. Then, the operated push rod 20 moves the pressure plate 7 against the spring force of the clutch spring 19 in the direction of the shaft axis, and releases the spring force applied to the clutch plates 5 and 6. Thus, the frictional engagement between the clutch plates 5 and 6 is released, and the clutch C turns to a disconnected state where the torque is not transmitted between the clutch outer 2 and the clutch inner 4.

Referring to FIG. 1(B) in combination, the thrust washer 8 with which the driven gear 1 made of an iron-based alloy and the clutch outer 2 made of a light metal-based alloy are brought into contact in the axial direction is formed of an iron-based alloy, and is sandwiched between annular contact portions 21 provided on the web portion 1*c* and annular contact portions 22 provided on the bottom portion 2*c* by urging force of a disc spring 23 as urging means interposed between the driven gear 1 and the holding member 17. Accordingly, the thrust washer 8 contacts contact surfaces 21*a* and 22*a* respectively of the contact portions 21 and 22 in both contact surfaces 8*a* and 8*b* thereof in a state of being pressed thereagainst, respectively. Therefore, the thrust washer 8 is also a positioning member which defines an axial position of the clutch outer 2 with respect to the driven gear 1.

Then, in an axial space between the driven gear 1 and the clutch outer 2, the regulating member which regulates the positional change of the position of the clutch outer 2 in the direction of the shaft axis and the axially positioning members of the clutch outer 2 are only provided outward of the damper springs 3 in the radial direction like the thrust washer 8. Accordingly, inward of the damper springs 3 in the radial direction, between the boss portion 1*a* and the damper springs 3, an annular oil inflow space 25 in which a minimum width W2 in the direction of the shaft axis is larger than a maximum thickness between the portions of the thrust washer 8 in the direction of the shaft axis, which contact the driven gear 1 and the clutch outer 2. In other words, the minimum width W2 in the direction of the shaft axis is larger than an maximum thickness W1 between both of the contact surfaces 8*a* and 8*b* in the direction of the shaft axis is formed in over a half range in the circumferential direction. Then, the respective through holes 15 are open to the oil inflow space 25.

After being supplied through an oil passage provided in the transmission case 35 to an oil passage 26 provided in the main shaft 31, oil discharged from the oil pump is further supplied to the oil inflow space 25 from the oil passage 26 through oil passages 27 formed of diametrical holes provided in the collar 11 and through oil passages 28 formed of diametrical holes provided in a space in the needle bearing 12 and the boss portion 1*a*. In the oil inflow space 25, between the driven gear 1 and the clutch outer 2 in the axial direction, there are not arranged other separate members than the driven gear 1 and the clutch outer 2, such as members which regulate the position of the clutch outer 2 with respect to the driven gear 1 in the direction of the shaft axis.

Accordingly, in comparison with the case where the other separate members are arranged therein, the oil inflow space 25 is a space with a relatively large capacity, and by an amount of this, becomes a space where a large amount of oil is present. Then, an abundant amount of the oil which has flown from the oil passages into the oil inflow space 25 lubricates sliding portions among the driven gear 1, the clutch outer 2, the thrust washer 8, the damper springs 3, and the holding members 17, such as sliding portions between the boss portion 1*a* of the driven gear 1 and the boss portion 2*a* of the clutch outer 2, between the thrust washer 8 and both of the contact portions 21 and 22, and between the damper springs 3, the holding recessed portions 14, and the holding members 17.

Among them, on at least one of both of the contact surfaces 21*a* and 8*a*, which are the sliding portions between the driven gear 1 and the thrust washer 8, on the contact surface 21*a* in this embodiment, oil grooves 29 extended in the circumferential direction are provided. Each through hole 15 has a farthest portion 15*a* from the rotation centerline L at a position in a direction of a diameter which is larger than ½ of an inner diameter of the thrust washer 8 and smaller than ½ of an outer diameter thereof. Accordingly, the thrust washer 8 has a size to cross the respective through holes 15 in the circumferential direction. Therefore, the oil grooves 29 are circular arc grooves partitioned by the respective through holes 15, and between the through holes 15 adjacent to each other in the circumferential direction, one or a plurality of the oil grooves 29, one thereof in this embodiment is provided.

Then, a part of the oil discharged to the oil inflow space 25 flows into the oil grooves 29 though the through holes 15 from openings 29*a* on a rotation direction side in a rotation direction of the clutch C, the openings 29*a* being ones of openings on both ends of the oil grooves 2 and being open to the through holes 15. The oil which has flown into each of the oil grooves 29 from the opening 29*a* flows through the oil groove 29 while lubricating both of the contact surfaces 8*a* and 21*a*, and flows out from the other opening on an opposite side in the rotation direction to another through hole 15. Therefore, when the clutch C rotates, both of the contact surfaces 8*a* and 21*a* are lubricated by the oil which always flows through the oil grooves 29.

Next, a description will be made of functions and effects of the embodiment constructed as described above.

In the clutch C, the thrust washer 8 is only disposed outward of the damper springs 3 in the radial direction, and between the driven gear 1 and the clutch outer 2 in the direction of the shaft axis. Thus, position regulation of the clutch outer 2 in the direction of the shaft axis is performed close to the outer circumference of the clutch outer 2, which is apart from the rotation centerline L. Accordingly, in comparison with the case where the thrust washer is disposed inward of the damper springs 3 in the radial direction, even in the case where the center P of each of the damper springs 3 is axially offset close to the clutch outer 2 with respect to the driven gear 1, the positional change of the clutch outer 2 in the direction of the shaft axis is effectively suppressed, thus the tilting of the clutch outer 2 is effectively suppressed.

Furthermore, the outer circumference portion 2b of the clutch outer 2 is suppressed from being expanded by centrifugal force. In addition, the thrust washer 8 is only located outside of the damper springs 3 between the driven gear 1 and the clutch outer 2 in the axial direction, and accordingly, contributes to suppression of a weight increase of the clutch C or to weight reduction thereof.

The oil grooves 29 are provided on the contact surface 21a which is at least one of the contact surfaces 21a and 8a of the driven gear 1 and the thrust washer 8 contacting each other. Thus, frictional force between the contact portion 21 of the driven gear 1 and the thrust washer 8 is reduced by the oil in the oil grooves 29, and when the driven gear 1 and the clutch outer 2 rotate relatively to each other, the sliding between the driven gear 1 and the thrust washer 8 becomes smooth. Accordingly, stability of damper characteristics brought by the damper springs 3 is enhanced.

The annular oil inflow space 25 to which the oil is supplied is formed inward of the damper springs 3 in the radial direction, and between the input rotator and the clutch outer 2 in the direction of the shaft axis, and the minimum width W2 of the oil inflow space 25 in the direction of the shaft axis is larger than the maximum thickness W1 of the thrust washer 8 in the direction of the shaft axis in over a half range in the circumferential direction. Thus, between the thrust washer 8 and the clutch outer 2 in the direction of the shaft axis, the oil inflow space 25 with a large capacity is formed owing to the fact that the minimum width W2 is larger than the maximum thickness W1.

Accordingly, the sliding portions among the driven gear 1, the clutch outer 2, the thrust washer 8, the damper springs 3, and the holding members 17 are lubricated by the abundant amount of oil, and lubricity thereof is enhanced. In addition, the other separate members than the driven gear 1 and the clutch outer 2, such as the thrust washer, are not provided in the oil inflow space 25, and accordingly, the oil inflow space 25 with a large capacity is formed without upsizing the clutch C in the direction of the shaft axis.

The oil grooves 29 communicate with the oil inflow space 25 through the through holes 15, thus making it possible for a sufficient amount of the oil to flow into the oil grooves 29 from the oil inflow space 25 in which the abundant amount of oil is present. Accordingly, the lubricity between the contact portion 21 and the thrust washer 8 is further enhanced.

For an embodiment in which a partial construction of the above-described embodiment is modified, a description will be made below of the modified construction.

The center P of each of the damper springs 3 may be located within the holding recessed portion 14 in the axial direction.

The clutch C may be used for a power transmission device of a machine other than the vehicle, and further, the power transmission device does not have to include the transmission.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A clutch comprising:
   a clutch outer;
   damper springs for transmitting, to the clutch outer, torque inputted to an input rotator; and
   a regulating member for regulating positional change of the clutch outer with respect to the input rotator in a direction of a shaft axis, the regulating member being disposed between the input rotator and the clutch outer in an axial direction,
   wherein the regulating member is disposed only outward of the damper springs in a radial direction,
   wherein an annular oil inflow space is formed between the input rotator and the clutch outer in the direction of the shaft axis, and inward of the damper springs in the radial direction, the annular oil inflow space being supplied with oil for lubricating sliding portions among the input rotator, the clutch outer, and the regulating member, and
   a minimum width (W2) of the oil inflow space in the direction of the shaft axis in over a half range in a circumferential direction is larger than a maximum thickness (W1) between portions of the regulating member in the direction of the shaft axis, the portions respectively contacting the input rotator and the clutch outer.

2. The clutch as recited in claim 1,
   wherein an oil groove is provided on at least one of contact surfaces respectively of the input rotator and the regulating member, the contact surfaces contacting each other.

3. The clutch as recited in claim 2, wherein the oil groove extends in a circumferential direction.

4. The clutch as recited in claim 2, wherein the oil groove is a plurality of oil grooves formed in the input rotator and extending in a circumferential direction.

5. The clutch as recited in claim 1, wherein the input rotator is a driven gear having a boss portion fitted to an outer circumference of a needle bearing, a rim portion on which teeth meshing with a drive gear are formed, and a web portion coupling the boss portion and the rim portion to each other.

6. The clutch as recited in claim 1, wherein centers (P) of the damper springs in the axial direction are located between holding holes of the input rotator and holding recessed portions of the clutch outer, and positions of application points in the input rotator and the clutch outer, to which spring forces of the damper springs are applied, are offset from the centers (P) of the damper springs in the axial direction.

7. The clutch as recited in claim 1, wherein the regulating member is disposed between annular contact portions of the input rotator and the clutch outer.

8. The clutch as recited in claim 1, wherein the regulating member and the input rotator are made of an iron-based alloy, and the clutch outer is made of a light metal-based alloy.

9. The clutch as recited in claim 1, wherein the damper springs are held between the clutch outer and holding members in the direction of the shaft axis in a state where positional changes thereof are restricted in the direction of the shaft axis.

10. A clutch comprising:
    an input rotator;
    a clutch outer;
    damper springs for transmitting, to the clutch outer, torque inputted to the input rotator;
    holding members arranged opposite to the clutch outer while sandwiching the input rotator with the clutch outer;
    the respective damper springs being held by the clutch outer and the holding members; and a thrust washer for regulating positional change of the clutch outer with respect to the input rotator in a direction of a shaft axis, the thrust washer being disposed between the input rotator and the clutch outer in an axial direction, wherein the thrust washer is disposed only outward of the damper springs in a radial direction, wherein centers (P) of the damper springs in the axial direction are located between holding holes of the input rotator and holding recessed portions of the clutch outer, and positions of application points in the input rotator and the clutch outer, to which spring forces of the damper springs are applied, are offset from the centers (P) of the damper springs in the axial direction, and wherein the centers (P) of the damping springs are offset in a direction toward the clutch outer with respect to a driven gear and also in a direction toward the shaft axis, thus making it possible to reduce a protruding amount of the damper springs to an opposite side of the clutch outer in the direction of the shaft axis.

11. The clutch as recited in claim 10, wherein an oil groove is provided on at least one of contact surfaces respectively of the input rotator and the thrust washer, the contact surfaces contacting each other.

12. The clutch as recited in claim 11, wherein the oil groove extends in a circumferential direction.

13. The clutch as recited in claim 11, wherein the oil groove is a plurality of oil grooves formed in the input rotator and extending in a circumferential direction.

14. The clutch as recited in claim 10, wherein an annular oil inflow space is formed between the input rotator and the clutch outer in the direction of the shaft axis, and inward of the damper springs in the radial direction, the annular oil inflow space being supplied with oil for lubricating sliding portions among the input rotator, the clutch outer, and the thrust washer, and a minimum width (W2) of the oil inflow space in the direction of the shaft axis in over a half range in a circumferential direction is larger than a maximum thickness (W1) between portions of the thrust washer in the direction of the shaft axis, the portions respectively contacting the input rotator and the clutch outer.

15. The clutch as recited in claim 10, wherein the input rotator is a driven gear having a boss portion fitted to an outer circumference of a needle bearing, a rim portion on which teeth meshing with a drive gear are formed, and a web portion coupling the boss portion and the rim portion to each other.

16. A clutch comprising:

a driven gear;

a closed-end cylindrical clutch outer;

damper springs for transmitting, to the clutch outer, torque inputted to the driven gear;

holding members arranged opposite to the clutch outer while sandwiching the driven gear with the clutch outer;

the respective damper springs being held by the clutch outer and the holding members; and a thrust washer for regulating positional change of the clutch outer with respect to the driven gear in a direction of a shaft axis, the thrust washer being disposed between the driven gear and the clutch outer in an axial direction, wherein the thrust washer is disposed only outward of the damper springs in a radial direction, wherein an oil groove is provided on a contact surface of the driven gear, and wherein the contact surface of the driven gear and a contact surface of the thrust washer contact each other.

17. The clutch as recited in claim 16, wherein an annular oil inflow space is formed between the driven gear and the clutch outer in the direction of the shaft axis, and inward of the damper springs in the radial direction, the annular oil inflow space being supplied with oil for lubricating sliding portions among the driven gear, the clutch outer, and the thrust washer, and a minimum width (W2) of the oil inflow space in the direction of the shaft axis in over a half range in a circumferential direction is larger than a maximum thickness (W1) between portions of the thrust washer in the direction of the shaft axis, the portions respectively contacting the driven gear and the clutch outer.

* * * * *